Aug. 24, 1965  R. W. COOK  3,201,975
METHOD FOR LOCATING PIPE JOINTS
Filed April 25, 1960
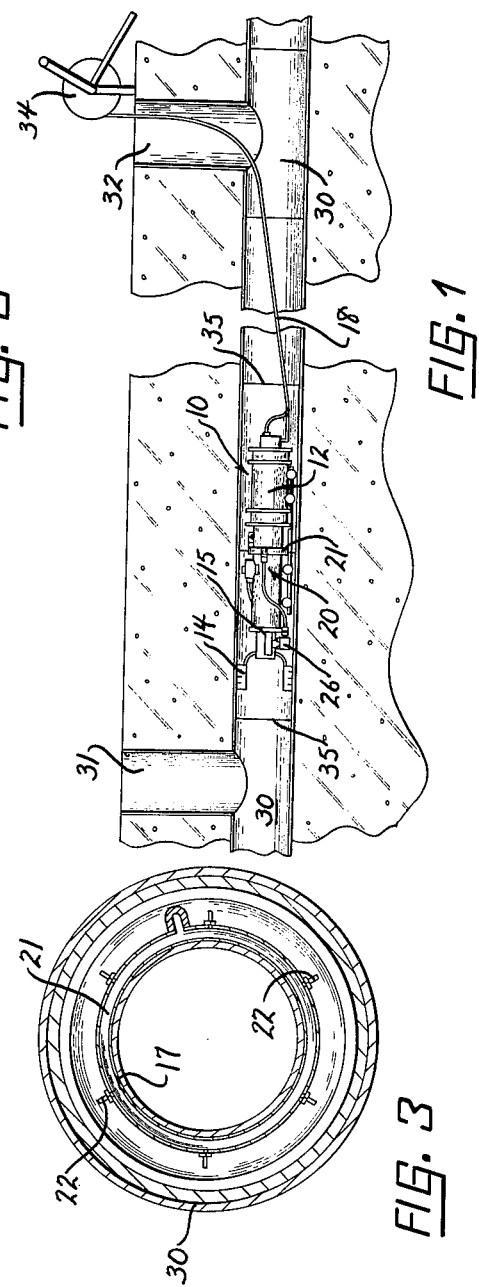
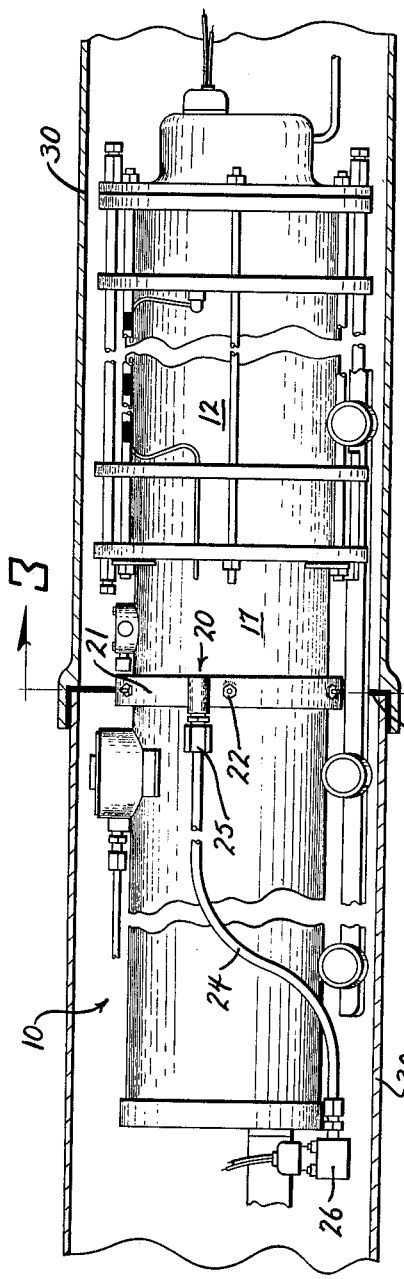
INVENTOR.
ROBERT W. COOK
BY
Lockwood Woodard Smith & Weikart
Attorneys

3,201,975
METHOD FOR LOCATING PIPE JOINTS
Robert W. Cook, Decatur, Ind., assignor to
C. W. Fuelling, Inc., Fort Wayne, Ind.
Filed Apr. 25, 1960, Ser. No. 24,375
3 Claims. (Cl. 73—40.5)

The present invention relates to a pipe-joint locating device, and more particularly to a new and novel structure which utilizes air means for locating the joints in an underground pipe or like conduit.

As is known, with the advent of increased gas usage, for example, and the transmission of gas at increased pressures, the underground network of pipes or mains for distributing such gas has been overtaxed inasmuch as the present operating conditions were not considered in the original design thereof. As a result, and, in addition, because of age, the existing gas transmission networks have presented a serious leakage problem which, oftentimes, has created a dangerous situation in various localities.

In order to overcome the aforesaid leakage problems without the formidable task of making innumerable evacuations at each of the joints in the gas transmission pipe, and/or even the replacement of entire sections of pipe because of leaks therein, an apparatus and a method have been developed for sealing the underground gas lines. Such a pipe sealing apparatus and the method are disclosed and claimed in the Cook et al. Patent No. 2,894,539, entitled, Pipe Sealing Apparatus and Method, which issued on July 14, 1959, and which patent is incorporated herein by reference insofar as the disclosure thereof is necessary. Such prior apparatus, however, representatively included magnetic means for detecting the location of joints, fissures or the like in underground pipe.

By virtue of the instant invention, the applicant has developed a new and novel structure and method for locating a joint in an underground pipe which employs air as the operational basis thereof. Briefly, and as a matter of expediency, the instant invention will be disclosed herein in connection with the pipe sealing apparatus disclosed by the aforesaid Cook et al. patent. Basically, the applicant's novel device comprises an annular member disposed around a portion of the body of the Cook et al. pipe sealing apparatus, which annular member is hollow and is connected to a source of pressurized air through a common solenoid valve. The air is expelled from the annular member through a series of peripherally disposed nozzles or jets thereon and, as the pipe sealing apparatus is moved through an underground conduit, the air pressure against the inner surface of the pipe or main provides a constant audible sound until a pipe joint is located, whereupon, an audible variation occurs. With the detection of the joint, sealing thereof can then be readily effected by the aforesaid apparatus.

The instant invention not only indicates the presence of a joint, but with the use of a single jet or a plurality of separately operable jets, the operator can also determine the presence of a tap in the underground pipe from the audible sound variation. Thus, the applicant's novel method and apparatus afford multiple advantages not available in pipe-joint locating devices heretofore in use.

Accordingly, the principle object of the present invention is to provide a new and novel structure utilizing air to locate a joint or a tap in an underground conduit.

Another object of the present invention is to provide a new and novel structure and method which are readily adaptable to use with pipe sealing apparatus for establishing the locations of necessary joint sealing operations.

A further and more general object of the present invention is to provide a new and novel pipe-joint or tap locating device which is simple to manufacture, and highly effective in solving a serious safety problem prevalent today in connection with leaking utility mains.

Other objects and a better understanding of the invention will become more apparent from the following description, taken in conjunction with the accompanying drawing, wherein FIG. 1 is a representative view showing typical use of apparatus on which the instant invention is positioned;

FIG. 2 is a view in side elevation, partly in section, showing the instant invention disposed on a pipe sealing apparatus positioned within an underground conduit; and, FIG. 3 is a view in vertical section, taken at line 3—3 of FIG. 2 and looking in the direction of the arrows, showing further details of the instant invention, but, for clarity, omitting details of the apparatus on which it is disposed.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's novel invention is typically disposed on the pipe sealing apparatus 10 disclosed and claimed in the aforesaid Cook et al. Patent No. 2,894,539, the disclosure of which patent, as stated hereabove, is made a part hereof, where necessary. The Cook et al. pipe sealing apparatus 10 typically comprises the novel pipe-joint locating device 20 forming the instant invention, which not only locates the joint, but may also condition the same for further sealing operations; a sealing agent storage section 12 including, but not shown herein, mechanism for metering determinable quantities of sealing agent from the storage section and for proportioning the sealing agent so used; applicators 14 for applying and spreading sealing agent over the defective joint; and, a power system 15, also not particularly shown, for operating the applicators 14 and associated mechanism.

The applicant's novel pipe-joint locating device 20 is conventionally positioned on the outer surface 17 of a portion of the sealing apparatus 10. The instant invention typically comprises an annular member 21 having a series of air jets 22 peripherally disposed thereon. The annular member 21 connects to a pipe or conduit 24 through a fitting 25. An electrically operated solenoid valve 26 is disposed at the opposite end of the conduit 24 and is suitably bracketed to a portion of the sealing mechanism 10. The solenoid valve 26 electrically connects to a power control board for the sealing apparatus 10, and the energization thereof selectively controls the passage of air into the annular member 21.

When it is desired to operate the apparatus, and as should be evident from FIG. 1, an excavation 31 is made to an underground main 30, and the sealing apparatus 10 is disposed in the latter. Another excavation 32 is made to the main 30 through which a combined air and electrical cable 18 passes from the front of the sealing apparatus 10. A winch or similar structure 34 may be employed for controlling the movement of the sealing apparatus 10 along the main 30.

It will be obvious that excavations 31 and 32 should be large enough to permit the sealing apparatus 10 to be introduced into the main 30. It will also be obvious that a single excavation may be made from which the sealing apparatus may be pushed first in one direction through the main and then in the opposite direction by means of jointed rods or pipes. For example, the sealing apparatus may be pushed into a main as far as 500 feet and then pulled back and stopped at each pipe joint for applying a seal thereto.

As the sealing apparatus 10 is moved along the main 30, the electrical solenoid valve 26 is energized, causing air to be introduced into the conduit 24 and into the annular member 21. Air is then expelled through the jets 22 onto the inner surface of the main 30. A continuous audible sound is made as the sealing apparatus 10 travels along that portion of the main having no joint, seam or other fissure therein. However, when any of the latter is encountered, the sound varies and, accordingly, indicates the presence of a joint 35 or the like.

Thereafter, and as should be apparent from the aforesaid Cook et al. patent, the air stream may be utilized to condition the joint 35 for subsequent sealing by moving the annular member 21 back and forth thereover. As the relative position of the annular member 21 forming a part of the locating device is known with reference to the applicators 14 which serve to spread a sealing agent over the defective joint 35, the operator then moves the sealing apparatus 10 so that the applicators 14 are in position for operation.

As in the instance of the Cook et al. patent, the sealing agent, a plastic material, is typically fed to the applicators 14, followed by the rotation of the applicators 14 thereon for spreading the sealing agent over the defective joint 35. When the preceding operation is completed, the sealing apparatus 10 is moved along the main 30 until another joint 35 is reached.

Although the preceding discussion is with respect to the location of a joint in an underground main 30, the device is equally adapatable for use in determining the position of a tap therein when modified so that only a single jet, or a selective number of jets, is caused to operate. Towards the latter end, the invention disclosed herein may also be changed in that each of the individual jets may be selectively controlled by a solenoid so that, without moving any portion of the sealing apparatus, the selective passage of air from the jets can audibly detect the particular postion of a tap around the periphery of the inner surface of the gas main upon back and forth movement of the sealing apparatus 10. Moreover, this approach can also be expanded so that all the jets operate simultaneously, in annular relationship, as discussed hereabove, in locating a defective joint.

It should be apparent from the preceding discussion that the applicant has provided a new and novel approach to detecting the presence of a joint or tap in an underground transmission system, through an operation remote from the sight and direct manual control of an operator. By reason of audible signal variation, upon energization of a control for air, the joint or tap is readily detected and, subsequently followed by a series of sealing steps including, as noted hereabove, the possible conditioning of the joint by the same air detecting means, the introduction of a sealing agent into the joint, and the spreading of the latter therearound.

Obviously, the instant device is susceptible to changes within the spirit of the invention. For example, although the present invention has been discussed hereabove in connection with a sealing machine, it is obvious that it may be an independent unit for specialized detecting uses or, of course, scaled to any particular environmental application. Moreover, the position of the annular member 21 on the sealing apparatus 10 may be moved from that shown in the drawing, as desired. Thus, the above description should be considered illustrative and not as limiting the scope of the following claims.

The invention claimed is:

1. The method of locating a joint in an underground pipe which comprises the steps of producing in the atmosphere within said pipe a sound signal by expelling a pressurized fluid onto the inner surface of said pipe, said sound signal being audible at a remote point and directing said pressurized fluid progressively from point to point along the inside of said pipe until a variation occurs in the said sound signal.

2. The method of locating a tap in an underground pipe which comprises the steps of producing in the atmosphere within said pipe a sound signal by selectively expelling a pressurized fluid onto a portion of the inner surface of said pipe, said sound signal being audible at a remote point and directing pressurized fluid progressively from point to point along the inside of said pipe until a variation occurs in the said sound signal.

3. The method of locating a joint in an underground pipe which comprises the steps of producing in the atmosphere within said pipe a sound signal by selectively expelling a pressurized fluid onto a portion of the inner surface of said pipe, said sound signal being audible at a remote point and progressively directing said pressurized fluid against other portions of the inner surface of said pipe until an audible variation occurs in the said sound signal.

References Cited by the Examiner

UNITED STATES PATENTS

| 2,370,219 | 2/45 | Aller | 73—37.9 |
|---|---|---|---|
| 2,502,863 | 4/50 | Lockett | 73—40.5 X |
| 2,894,539 | 7/59 | Cook et al. | 138—97 |
| 2,940,302 | 6/60 | Scherbatskoy | 73—40.5 |
| 2,977,994 | 4/61 | Xenis | 138—97 |
| 3,016,733 | 1/62 | En Dean et al. | 73—40.5 |

ISAAC LISANN, *Primary Examiner.*

ROBERT L. EVANS, *Examiner.*